(12) United States Patent
Goss et al.

(10) Patent No.: US 6,865,390 B2
(45) Date of Patent: Mar. 8, 2005

(54) CELLULAR COMMUNICATIONS SYSTEM FEATURING A CENTRAL RADIO POOL/ TRAFFIC ROUTER

(75) Inventors: Stephen C. Goss, Wheaton, IL (US); Paul Raymond Sand, Woodridge, IL (US); Phillip Michael Sands, Champaign, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 632 days.

(21) Appl. No.: 09/888,848

(22) Filed: Jun. 25, 2001

(65) Prior Publication Data

US 2002/0197986 A1 Dec. 26, 2002

(51) Int. Cl.[7] .................................................. H04Q 7/20
(52) U.S. Cl. ........................ 455/445; 455/20; 455/21; 455/22; 455/23; 455/560
(58) Field of Search ............................... 455/403, 422.1, 455/424, 426.2, 454, 458, 13.3, 14, 160, 17, 446, 16, 21, 23, 560, 561, 562.1, 101, 102; 370/351, 241, 338, 253; 398/6, 7, 12, 14, 19, 20, 22, 43, 49, 57, 115, 118

(56) References Cited

U.S. PATENT DOCUMENTS 5,918,154 A * 6/1999 Beasley ..................... 455/11.1
6,026,302 A * 2/2000 Carlsson ..................... 455/446
6,188,879 B1 * 2/2001 Imamura .................. 455/277.1
6,597,908 B1 * 7/2003 Yu ............................. 455/424

FOREIGN PATENT DOCUMENTS

| EP | 0368673 A1 | 11/1989 |
| EP | 0685973 A3 | 5/1995 |
| EP | 0685973 A2 | 5/1995 |

* cited by examiner

Primary Examiner—Jean Gelin
(74) Attorney, Agent, or Firm—John B. MacIntyre

(57) ABSTRACT

The present invention provides a cellular communication system that includes a central radio pool/traffic router (CRP/TR) that sends control and traffic signals over fiber optic transmission links that connect the CRP/TR with base stations of the cellular communication system. The high bandwidth capacity of each fiber link allows a large band of radio frequencies representing many radio channels to pass between the CRP/TR and individual base stations. Radio resources can be shared by all base stations in the cellular communication system, dynamically, when and where needed, to meet access demands throughout the system. The CRP/TR includes low-powered digital and/or analog radios and also switching and modulation means used to convey signals between the radios and various base stations within the system.

7 Claims, 5 Drawing Sheets

CELLULAR COMMUNICATIONS SYSTEM FEATURING A CENTRAL RADIO POOL/ TRAFFIC ROUTER

FIELD OF THE INVENTION

The present invention relates generally to communications systems, and more particularly to a cellular system that uses a central radio pool to make better use of radio resources.

BACKGROUND OF THE INVENTION

A common type of cellular communications system employs one or more Mobile Switching Centers (MSC) connected to multiple base stations. An MSC typically includes a control complex and at least one switch which interfaces with the Public Switched Telephone Network (PSTN) and with other networks, allowing calls to flow between these networks and the cellular system. The control complex performs a variety of functions, including mobility management functions necessary to route calls to and from specific base stations, through which cellular phone users gain access to the cellular system.

A problem with cellular system designs like that just described is that each base station must be equipped with its own set of radio transceivers to provide access to cellular phone users operating within the base station's boundaries, commonly referred to as a cell. This presents a problem in that each base station must be equipped with enough radios to support a high demand for system access during peak times. When the demand for access diminishes during off-peak times, which can account for the greater part of the day, many of the radios in the base station can become idle, an expensive waste of resources. Thus, a problem with current art is that service providers must outlay substantial capital to equip their systems with a relatively high number of radios, many of which are underutilized throughout much of the day.

Contributing to this problem is the inherent inability of existing system designs to allow the sharing of idle radios across the network of base stations, so that base stations in temporary need of more radios can "borrow" from base stations having a temporary surplus. For example, cells located along inner city expressways might experience peak traffic during rush hours on weekdays, but relatively little traffic on weekends. Other cells located near a sport stadium might experience peak traffic during games on the weekends, but relatively little traffic during the weekdays. With current cellular system designs, radios available at base stations near the sports stadium can not be used to help meet rush hour demands at base stations along the expressway. Similarly, base stations near the sports stadium, straining to meet access demands during a weekend game, receive no help from idle radios located at the base stations in the inner city. Therefore, a need exists for a cellular communication system that allows its radio resources to be shifted to different base stations, when needed, to support system-wide traffic needs as the demand for access fluctuates from cell to cell throughout the day.

SUMMARY OF THE INVENTION

The above problems are substantially alleviated, and an advance is made over the teachings of the prior art in accordance with this invention, where the cellular system includes a central pool of radios, and where control and traffic signals are sent over fiber optic transmission links that connect the central radio pool with the base stations of the system. Advantageously, the high bandwidth capacity of each fiber link allows a large band of radio frequencies representing many radio channels to pass between the central pool of radios and individual base stations.

With this invention, radio resources for traffic, locate, and test purposes can be shared advantageously by all the base stations of a cellular system, dynamically, when and where needed, to meet access demands throughout the system. Similarly, control radios can be shared by multiple co-channel base stations. Because of this more efficient use of radio resources, fewer radios are needed to support system-wide access demands. This results in lower system costs, since fewer radios need to be purchased, and in lower maintenance costs, since the radios are fewer in number, centrally deployed, and thus more easily serviced. Furthermore, by reducing the amount of radio gear needed in the base stations, the present invention advantageously reduces the complexity, cost, and maintenance of the base stations deployed in the system. The invention also delivers advantages related to call processing, such as for handoffs, for example, as discussed below.

In accordance with an exemplary embodiment of the present invention, a central radio pool and traffic router (CRP/TR) is added to the mobile switching center that, under current art, comprises a switch and a control complex. The CRP/TR comprises low-powered digital and/or analog radios and also switching and modulation means used to convey signals between the radios and various base stations within the system.

In accordance with an exemplary embodiment of the present invention, the CTR/TR comprises low-powered radios connected to a radio frequency (RF) interconnect switch, which is coupled to RF combiner/splitters, which are coupled to optical modulator/demodulators. The optical modulator/demodulators convey signals to and from base stations over fiber optic transmission links. In accordance with a second exemplary embodiment of the present invention, the CRP/TR comprises low-powered radios coupled to optical modulator/demodulators, which are coupled to an optical switching matrix, which is coupled to optical multiplexer/demultiplexers. The optical multiplexer/demultiplexer feed signals to and from various base stations over fiber optic transmission links.

DESCRIPTION OF THE INVENTION

Figure 1:
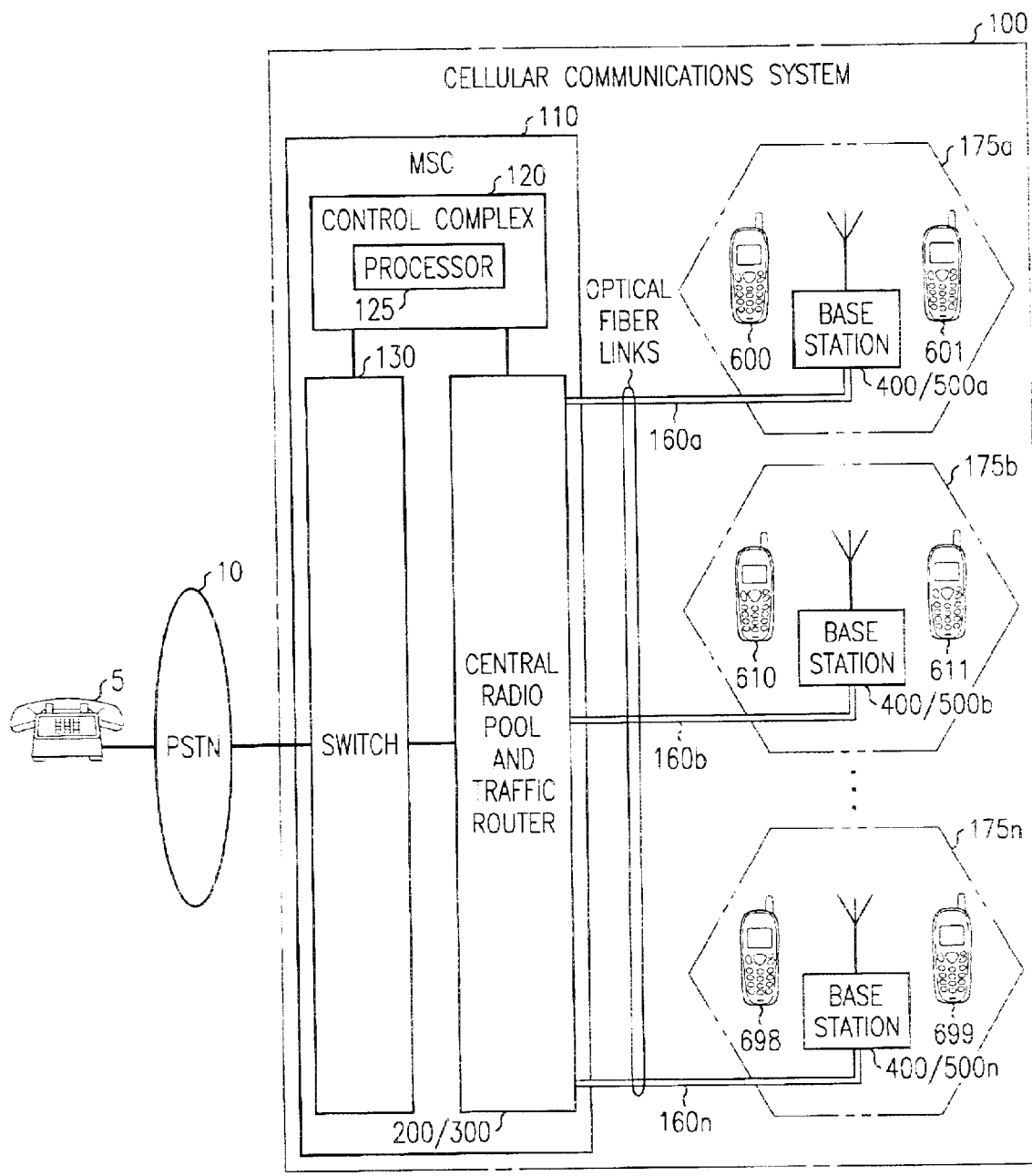
FIG. 1 depicts a cellular communication system including a central radio pool and traffic router (CRP/TR) in accordance with an exemplary embodiment of the present invention.

FIG. 1 depicts cellular communications system 100 comprising Mobile Switching Center (MSC) 110, fiber optic links 160a . . . n, base stations 400/500a . . . n, and cell phones 600, 601, 610, 611, 698, and 699. Base stations 400/500a . . . n, operating in corresponding cells 175a . . . n, transmit and receive radio signals to and from cell phones operating in cells 175a . . . n. Fiber optic links 160a . . . n are used to convey traffic and control signals between MSC 110 and base stations 400/500a . . . n. MSC 110 includes switch 130 that interfaces to Public Switch Telephone Network (PSTN) 10, control complex 120 that includes processor 125, and central radio pool and traffic router (CRP/TR) 200/300.

Figure 2:
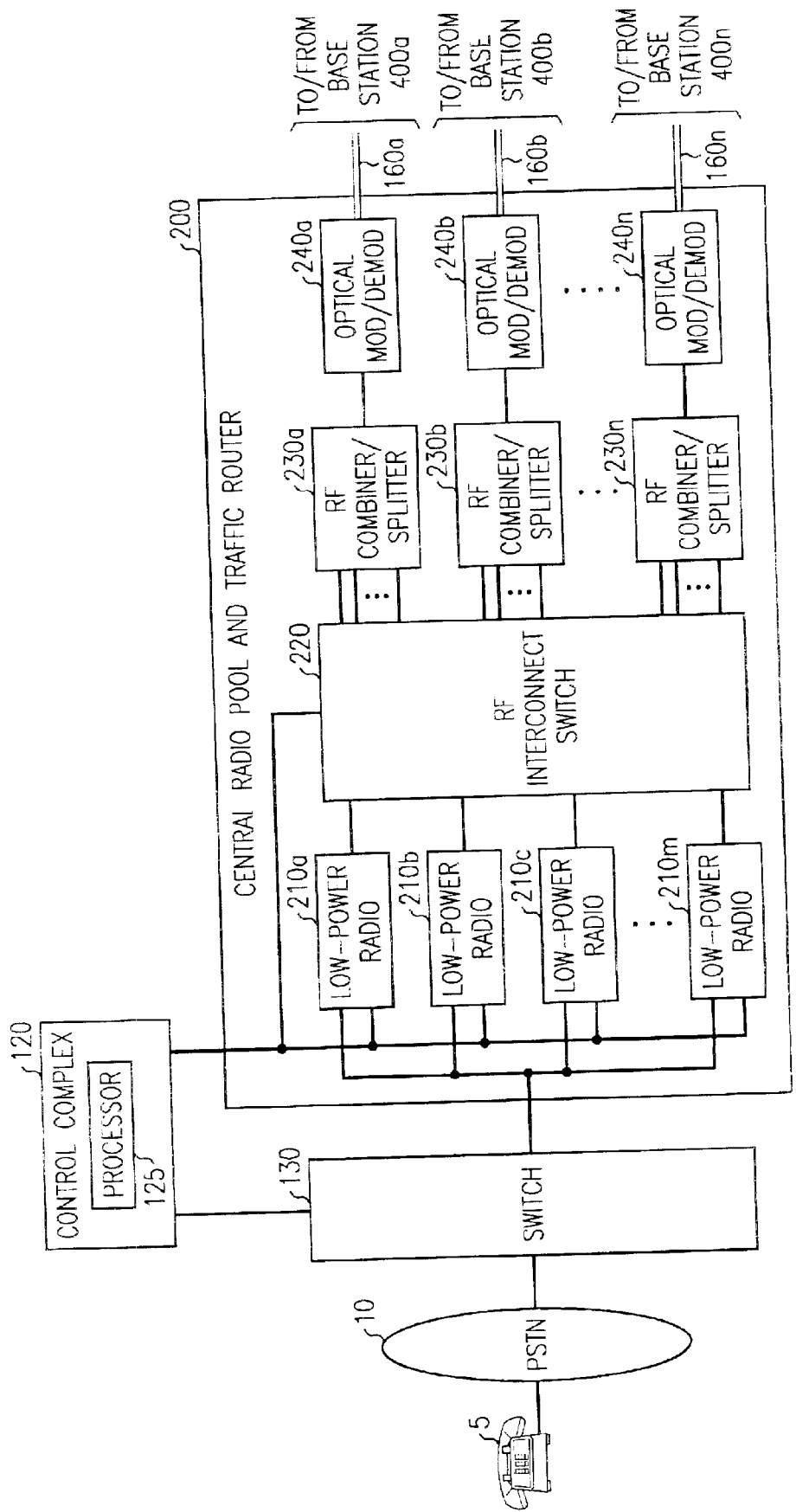
FIG. 2 depicts the CRP/TR of FIG. 1 in accordance with a first exemplary embodiment of the present invention.
Figure 4:
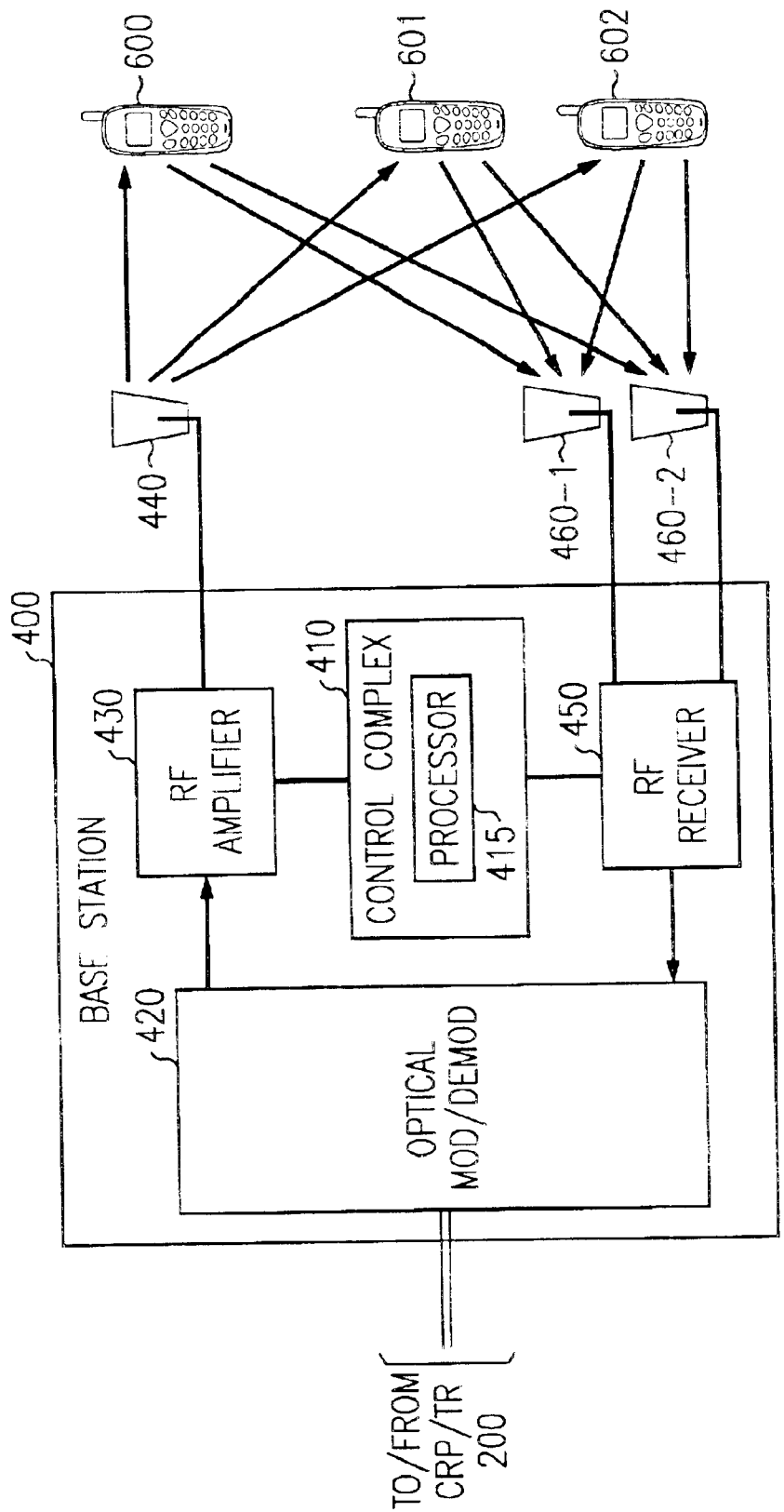
FIG. 4 depicts a simplified base station designed to operate with the first exemplary embodiment of the CRP/TR.

A first exemplary embodiment of the present invention can be better understood with reference to FIGS. 1, 2, and 4. As illustrated in FIG. 2, central radio pool and traffic router (CRP/TR) 200 comprises low-powered digital and/or analog radios 210a . . . m, Radio Frequency (RF) interconnect switch 220, RF combiner/splitters 230a . . . n, and optical modulator/demodulators 240a . . . n. Optical modulator/demodulators 240a . . . n convey signals to and from base stations 400a . . . n over transmission links 160a . . . n.

To better understand the interrelationship and operation of these components, consider an example of a typical call originated from wireline phone 5 to cell phone 600 operating in cell 175a. For simplicity, assume the call paths through specific components of cellular system 100 are already set up, and that the setup utilized a relatively small number of control radios to page and find cell phone 600. The example will now focus on how voice signals flow through the system.

Consider first the downlink path, from phone 5 to cell phone 600. As illustrated in FIG. 2, the voice signal from phone 5 arrives at switch 130, which passes it over a switched circuit to a radio that was selected by a program running in processor 125 when the call was set up. Advantageously, the program running in processor 125 can select any available radio 210a . . . m, independent of the terminating cell carrying the call. Furthermore, processor 125 can instruct any radio to tune to any radio channel, as needed, in accordance with the set of radio channels assigned to the terminating cell.

For this example, the call is passed to low-power radio 210a. Acting as a transmitter in the downlink, radio 210a modulates the voice signal of phone 5 onto a radio channel and feeds the modulated signal to RF interconnect switch 220, which passes the modulated signal to RF combiner/splitter 230a. In the downlink path, RF combiner/splitter 230a acts as a combiner that combines the radio channel selected for the call from wireline phone 5 with other radio channels selected for other calls. The resulting composite RF signal—which advantageously can include both digital and analog traffic—is passed to optical modulator/demodulator 240a which acts as an optical modulator in the downlink. Optical modulator/demodulator 240a uses the composite RF signal to modulate an optical carrier, thus translating the composite set of radio channel frequencies to optical frequencies. The modulated optical carrier travels to base station 400a over fiber link 160a. An advantage of this arrangement is that radio channel spacing can be preserved when the composite RF signal is encoded onto the optical carrier.

FIG. 4 illustrates the first exemplary embodiment of base station 400 designed to work with CRP/TR 200. For the present example, FIG. 4 could represent base station 400a. There, optical demodulator/modulator 420 acts as a demodulator in the downlink. It extracts the composite RF signal from the optical carrier and passes it to wideband linear RF amplifier 430. By using a wideband linear amplifier, a composite RF signal spanning most or all frequencies available to the service provider can be amplified together and sent to a single antenna. In practice, depending upon power requirements and/or other limitations, multiple amplifiers may be required along with the means to route specific channels to specific amplifiers. For the present example, RF amplifier 430 feeds its output to transmit antenna 440, which radiates the signal into the cell for reception by all cell phones operating within the cell, including cell phone 600.

Consider now the flow of the uplink voice signal from cell phone 600 to phone 5. Multipath signals from cell phone 600 reach diversity receive antennas 460-1 and 460-2, as do multipath signals from other cell phones 601 and 602 operating within the cell. These signals are passed to wideband RF receiver 450, where they are preferably diversity-processed to produce a more robust signal before being passed to optical demodulator/modulator 420, which acts as an optical modulator in the uplink. There, the diversity-processed signal is preferably used to modulate an optical carrier, which travels over fiber link 160a to CRP/TR 200. Alternately, the composite signals from the two receive antennas can be passed separately to optical modulator 420, and the two receive signals sent to CRP/TR 200 for subsequent diversity processing in radio 210a.

Referring again to FIG. 2, the uplink signal from base station 400 enters optical modulator/demodulator 240a which acts as an optical demodulator in the uplink. The optical demodulator takes the composite RF signal off the optical carrier and passes it to RF combiner/splitter 230a, which acts as an RF splitter in the uplink. The RF splitter separates the individual radio channels or bands of channels and passes them over individual paths to RF interconnect switch 220. The radio channel or band of channels associated with cell phone 600 is passed to radio 210a, which operates as a receiver in the uplink. Radio 210a converts the RF signal into a voice signal that is passed through switch 130 and PSTN 10 to phone 5.

A key advantage of the first exemplary embodiment of the present invention is that any of the low-power radios 210a . . . m can be used to communicate with cell phones in any of the cells 175a . . . n, as needed. For example, a new call intended for a user in cell 175b might be set up to use radio 210c. For that call, the voice-related signals would flow between the caller's phone, PSTN 10, switch 130, radio 210c, RF switch 220, RF combiner/splitter 230b, optical modulator/demodulator 240b, transmission path 160b, and base station 400b. After that call ends, processor 125 could instruct radio 210c to tune to a different channel for a new call intended for a cell phone in a different cell—say cell 175n. For that call, the voice-related signals would flow between the caller's phone, PSTN 10, switch 130, radio 210c, RF switch 220, RF combiner/splitter 230n, optical modulator/demodulator 240n, transmission path 160n, and base station 400n.

Deploying the CRP/TR of the present invention advantageously simplifies cellular call processing. For instance, when negotiating analog handoffs under current art, base stations must use transmission resources to communicate with surrounding base stations and with the MSC. Using the present invention, handoffs can be made solely under control of a program operating in processor 125. For example, consider an analog handoff between cells 175a and 175b. Assume radio 210a is already on the call, and that radio 210m is available for use. Processor 125, upon receiving indication from radio 210*a* that a handoff is needed, bridges radio 210*m* onto the voice paths to and from switch 130, and sets up paths through RF switch 220, RF combiner/splitter 230*b*, and optical modulator/demodulator 240*b* which feeds the fiber optic link connected to base station 400*b*. Processor 125 also instructs radio 210*m* to tune to a frequency used within cell 175*b*. Processor 125 instructs radio 210*a* to send a control message, preferably using blank and burst signaling, to the cellular user's phone to order that phone to change to the new radio channel. Once the handoff is made, radio 210*a* can be used, and retuned if necessary, for another call in any cell, as needed.

Deploying a CRP/TR in a system advantageously reduces the complexity, cost, and required maintenance of the base stations by reducing the number of radio resources required at the base stations. For downlink signals, just one or more linear RF amplifiers would be needed. For uplink signals, a single wideband radio receiver can be used. Advantageously, the simplified base station is cost-effective. Of course, service providers may choose to include additional radios and other equipment at a base station to provide supplementary voice, control, locate, monitoring, diagnostic, and/or test functionality.

Figure 3:
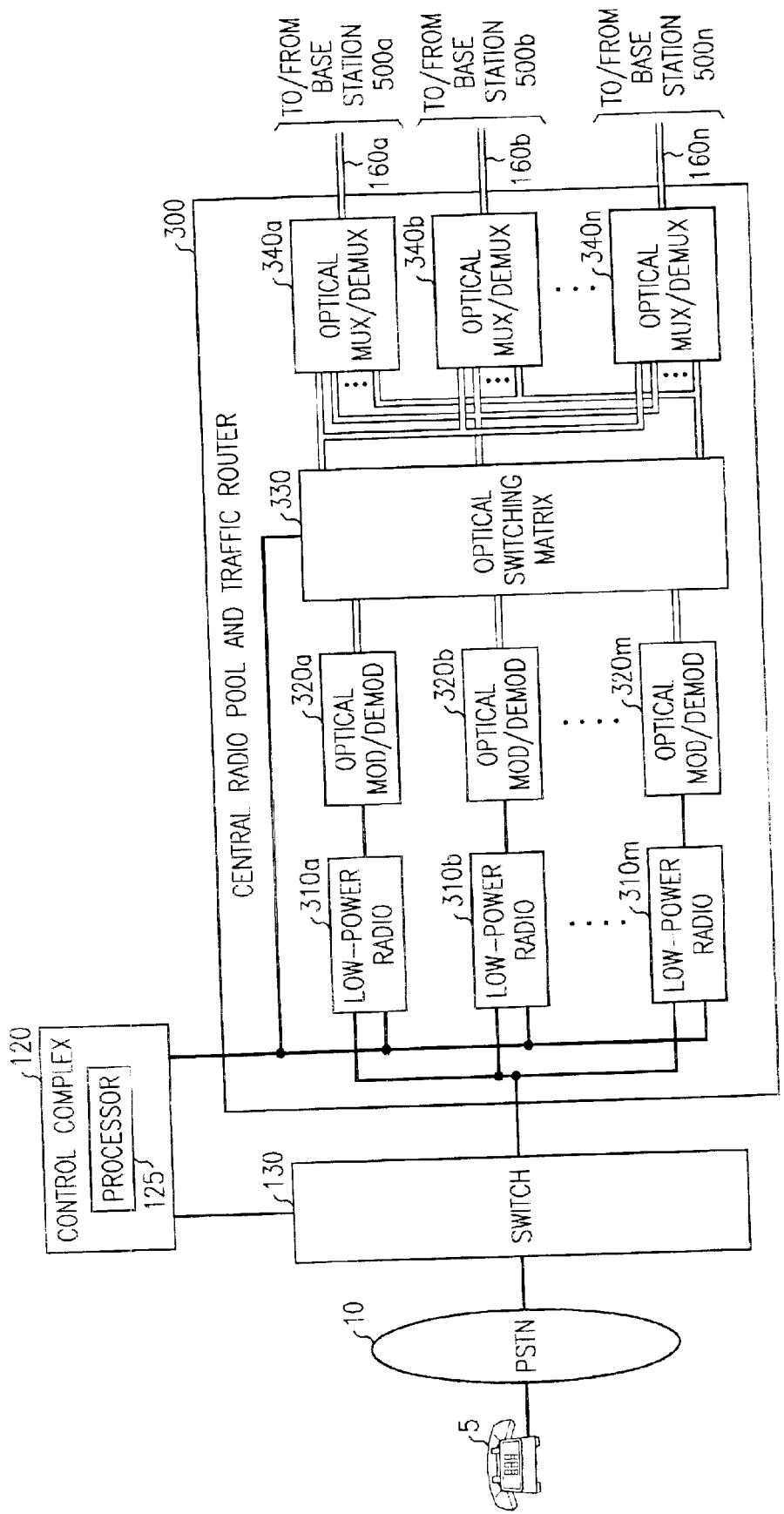
FIG. 3 depicts the CRP/TR of FIG. 1 in accordance with a second exemplary embodiment of the present invention.
Figure 5:
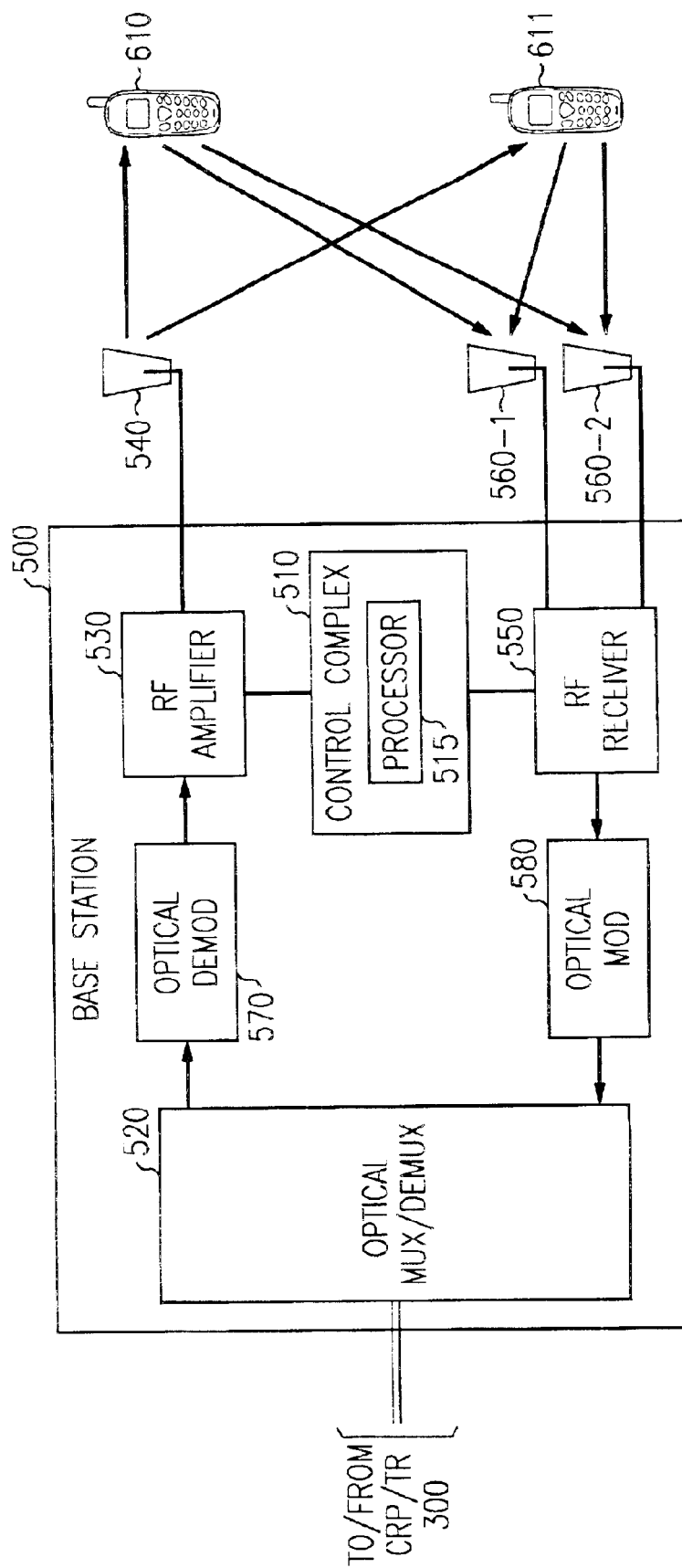
FIG. 5 depicts a simplified base station designed to operate with the second exemplary embodiment of the CRP/TR.

FIGS. 1, 3, and 5 are useful in explaining a second exemplary embodiment of the present invention. As illustrated in FIG. 3, the second exemplary embodiment of CRP/TR 300 features low-powered digital and/or analog radios 310*a* . . . *m*, optical modulator/demodulators 320*a* . . . *m*, optical switching matrix 330, optical multiplexer/demultiplexers 340*a* . . . *n*, and transmission links 160*a* . . . *n*.

To better understand the interrelationship and operation of components of the second exemplary embodiment, consider an example of a typical call. In this example, a call is placed by caller "A" on phone 5 to cell phone 610 operating in cell 175*b*. To simplify the discussion, assume the call paths for the call are already set up, and the following discussion will focus on how voice signals flow through the system.

In the downlink path from phone 5 to cell phone 610, caller A's voice signal arrives at switch 130 and is passed to radio 310*m*, which acts as a transmitter in the downlink. The radio puts caller A's voice on a radio channel and feeds it to optical modulator/demodulator 320*m*, which acts as an optical modulator in the downlink. The optical modulator uses the radio signal to modulate an optical carrier, thus translating the radio frequencies to optical frequencies, and thus converting the radio channel to an optical channel. The optical channel frequencies used by optical modulator/demodulators 320*a* . . . *m* are preferably assigned by a program running in processor 125. Modulator 320*m*'s output is passed over a fiber link to optical switching matrix 330 which passes it to optical multiplexer/demultiplexer 340*b*, which acts as a multiplexer in the downlink. The optical multiplexer uses current art such as dense wave division multiplexing (DWDM) to combine caller A's optical channel with other optical channels operating at different frequencies associated with other calls. The composite optical signal is sent over fiber link 160*b* to base station 500*b* operating in cell 175*b*.

FIG. 5 illustrates a second exemplary embodiment of a base station designed to work with CRP/TR 300. For the present example, FIG. 5 could represent base station 500*b*. There, optical demultiplexer/multiplexer 520 acts as a demultiplexer in the downlink. It separates all the individual optical channels from the composite optical signal and sends them to optical demodulator 570. The demodulator reverts each individual optical channel to its associated radio channel, restoring the correct channel spacing if necessary. All the radio channels, correctly spaced, are passed to wideband linear RF amplifier 530. The signal is amplified and sent to antenna 540, which radiates the signal into the cell for the benefit of all the cell phones operating therein—including cell phone 610.

Regarding the flow of the uplink signal from cell phone 610 to phone 5, multipath signals from cell phone 610 reach diversity receive antennas 560-1 and 560-2, as do multipath signals from other cell devices operating within the cell. These signals are passed to wideband RF receiver 550, where they are preferably diversity-processed to produce a more robust signal. The signal is passed to optical modulator 580, which produces individual optical channels corresponding to individual radio channels operative within the cell. The individual optical channels travel over fiber to optical demultiplexer/multiplexer 520, which acts as a multiplexer in the uplink. The multiplexer effectively combines the individual optical channels and sends the composite optical signal over link 160*b* to CRP/TR 300.

Referring again to FIG. 3, the composite optical signal, preferably diversity-processed, arrives at CRP/TR 300 over optical link 160*b*. The signal enters optical multiplexer/demultiplexer 340*b*, which acts as demultiplexer in the uplink. The optical demultiplexer separates all the individual optical channels from the composite optical signal and sends them to optical switching matrix 330 to be passed along their assigned paths. Thus, the optical channel associated with cell phone 610 is passed to optical modulator/demodulator 320*m*, which acts as a demodulator in the uplink. The demodulator reverts the optical channel to its associated radio channel frequencies, and passes them to radio 310*m*, which acts as a receiver in the uplink. The radio converts the RF signal into a voice signal that is passed through switch 130 and PSTN 10 to phone 5.

While FIG. 3 shows radios 310*a* . . . *m* connected to dedicated optical modulator/demodulators 320*a* . . . *m*, it should be understood that cross connection of each radio to multiple modulator/demodulators could be implemented to allow any radio to pass signals to any modulator/demodulator in order to, for example, improve the reliability of the system. For example, if optical modulator/demodulator 320*a* becomes inoperable, radio 310*a* could still be deployed by the system by routing signals to and from it through optical modulator/demodulator 320*b*.

For both the first and second exemplary embodiments of the present invention, it is preferred that the encoded radio channels that travel along the fiber links between the MSC and base stations maintain their intended RF channel spacing and be banded at the RF frequencies intended for transmission at the base stations and for reception at the CRP/TR. Alternately, if component limitations dictate, the RF signals can be sent as a downbanded range of frequencies at one end of the transmission link, and subsequently upbanded at the other end. For example, blocks of channels in the PCS band (1850 MHz to 1990 MHz) can be downbanded to fit on a 1 GHz wide optical channel for transmission across the fiber link, and subsequently be upbanded to their intended spectral positions at the other end.

While this invention has been described in terms of its application and related benefits in cellular systems having a MSC/base station architecture, similar application and benefits apply to other architectures that feature geographically disperse base stations where dedicated radios are deployed, such as in GSM systems, for example.

Thus, the present invention provides a communication system with a central radio pool that solves problems associated with the prior art.

While this invention has been described in terms of certain examples thereof, it is not intended that it be limited to the above description, but rather only to the extent set forth in the claims that follow.

We claim:

1. A method for transmitting a message from a first phone to a cell phone utilizing a central radio pool/traffic router, the method comprising the steps of:

receiving a voice signal from the first phone at a switch, the voice signal intended for the cell phone;

passing the voice signal from the switch to a radio;

modulating the voice signal at the radio onto a radio channel to produce a modulated voice signal;

feeding the modulated voice signal to an RF interconnect switch;

passing the modulated voice signal from the RF interconnect switch to an RF combiner/splitter;

combining by the RF combiner/splitter the radio channel with other radio channels used by other calls to form a composite RF signal;

passing the composite RF signal to an optical modulator/demodulator;

modulating an optical carrier by the optical modulator/demodulator using the composite RF signal, thereby translating the composite frequencies to optical frequencies;

sending the modulated optical carrier to a base station over an optical fiber link;

demodulating the optical carrier to produce a composite RF signal; and transmitting the composite RE signal from the base station to the cell phone.

2. A method for transmitting a message in accordance with claim 1, the method further comprising the step of, prior to passing the voice signal from the switch to the radio, selecting the radio by a program running in a processor.

3. A method for transmitting a message in accordance with claim 2, wherein the processor can select any of a plurality of available radios.

4. A method for transmitting a message in accordance with claim 2, wherein the selection is independent of the terminating cell carrying the call.

5. A method for transmitting a message in accordance with claim 2, wherein the processor can instruct any of a plurality of radios to tune to any of the plurality of available radio channels.

6. A method for transmitting a message in accordance with claim 1, wherein the resulting composite RF signal comprises both digital and analog traffic.

7. A method for transmitting a message in accordance with claim 1, wherein radio channel spacing is preserved when the composite RF signal is modulated onto the optical carrier.

* * * * *